United States Patent [19]
Fish et al.

[11] 3,885,091
[45] May 20, 1975

[54] METHOD AND APPARATUS FOR PIPELINE INSPECTION

[75] Inventors: Harold D. Fish; Karl H. Kalberer, both of Duncan, Okla.

[73] Assignee: Halliburton Company, Duncan, Okla.

[22] Filed: Oct. 24, 1973

[21] Appl. No.: 409,159

[52] U.S. Cl. .......... 178/6; 178/DIG. 1; 178/DIG. 8; 178/DIG. 29; 178/DIG. 38; 178/7.92
[51] Int. Cl. ............................................ H04n 7/18
[58] Field of Search. 178/DIG. 1, DIG. 38, DIG. 29, 178/DIG. 8, 7.92

[56] References Cited
UNITED STATES PATENTS

| | | |
|---|---|---|
| 2,971,259 | 2/1961 | Hahnau .................................. 33/1 |
| 3,215,774 | 11/1965 | Ikegami ............................. 178/6.8 |

*Primary Examiner*—Howard W. Britton
*Assistant Examiner*—Edward L. Coles
*Attorney, Agent, or Firm*—L. Lawton Rogers, III; Floyd A. Gonzalez; John N. Tregoning

[57] ABSTRACT

A pipeline inspection system including a camera having an annular illumination source surrounding the lens so that the illumination is concentrated on the pipeline sidewalls within the viewing angle of the camera. By use of near-infrared radiation having a wavelength on the order of 900 nanometers, improved operation can be obtained with GaAs emitters and a vidicon having a silicon target. The camera and its illumination source is adapted to be towed through the pipeline, and an instantaneous picture produced on an above-ground video display device.

15 Claims, 9 Drawing Figures

METHOD AND APPARATUS FOR PIPELINE INSPECTION

This invention relates to a method and apparatus for pipeline inspection employing a camera which is moved along the interior of the pipeline, and more particularly to novel illumination system including the use of near-infrared radiation.

Closed circuit television has recently been used for sewer inspections and with grouting apparatus for making repairs. With closed circuit television, location of leaks, points of infiltrations, paved-over manholes, pipeline breaks, and lost articles such as rings or other valuables can be accomplished without the disadvantages accompanying the digging up of the pipeline.

In using a camera for inspecting the interior of a right cylinder such as a pipeline, the camera should be located along the centerline of the pipeline and a wide angle lens used to provide a 360° peripheral view of the interior of the pipeline wall. One of the major problems has been to provide a satisfactory illumination arrangement which will allow the camera to obtain a close-up view of the interior pipeline wall.

A major object of the present invention resides in providing a novel method and apparatus for inspecting right cylindrical surface such as the interior of a pipeline.

Another object is to provide a novel illumination arrangement for a camera which is adapted to confine the major portion of the radiation onto the sidewalls of the right cylinder within the field of view of a camera having a wide angle lens. This illumination provides an annular band of radiation which has a reasonably uniform intensity along a sufficient length of the sidewall to allow the camera to obtain pictures having detail sufficient to show defects such as cracks and foreign objects that are in the pipeline.

A further object of the invention is to utilize radiation in the nearinfrared range having a wavelength between about 750 and 1,000 nanometers in a pipeline inspection system. Radiation at such frequencies is capable of high efficiency transmission through the atmosphere and when used with a vidicon having a silicon target provides increased sensitivity. Also, infrared emitting diodes for scene illumination require less power and hence generate less heat than is required where visible light is used. Due to increased vidicon sensitivity, it is possible to inspect more pipeline wall area per watt input power than is possible where radiation in the visible spectrum is used. Additionally, a greater range of pipeline diameters can be inspected with a particular configuration of radiating sources due to the increased sensitivity of the system.

It is a yet further object to provide an improved camera arrangement including a cable connector which provides the operating power for the radiation sources as well as for a camera, and which carries the electronic signals from the camera to the above-ground display device. After the camera is located in the pipeline, the iris and focus adjustments are manually made to provide the desired picture on the display device above ground, and thereafter the camera is propelled, as by towing, through the pipeline without the need for further adjustments of either the iris or focus.

These and other objects of the invention will become more fully apparent from the claims, and from a perusal of the detailed description when read in conjunction with the appended drawings.

Figure 1:
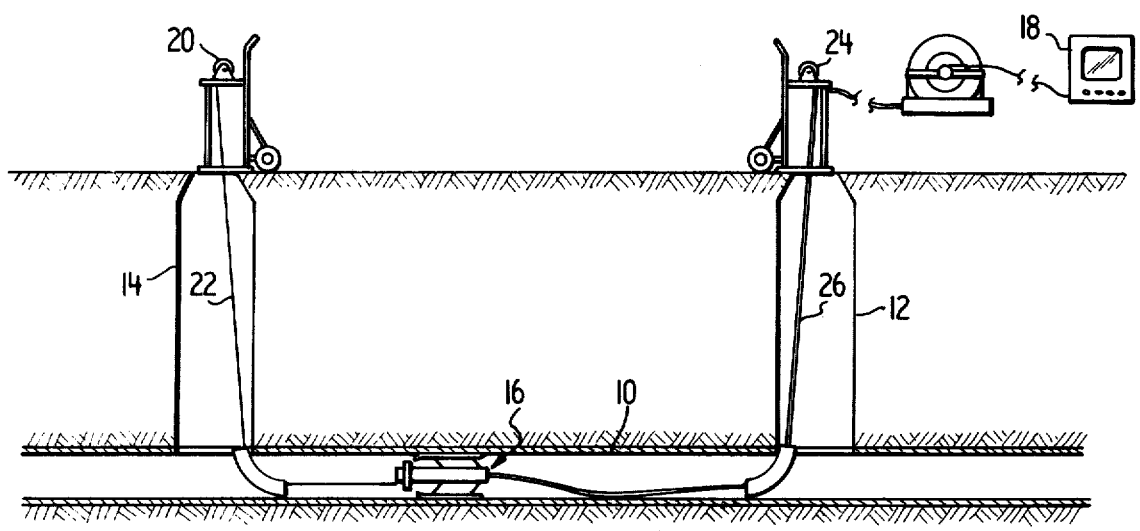
FIG. 1 is a elevation in section through a pipeline showing the camera in its underground position with the display device above ground.

The system of the present invention is shown in FIG. 1 wherein a section of pipeline 10 which is located between two manholes 12 and 14 contains the underground unit 16. Unit 16 includes a camera with a lens providing a wide viewing angle and a unique lighting or illuminating arrangement whereby the pipeline walls are irradiated with a sufficiently uniformly high intensity to permit structural defects of the pipeline walls to be picked up by the camera, which may carry a film pack or be a television camera. In the illustrated system, the camera carried by unit 16 is connected to an on-site display screen 18 such as a cathode ray tube. The illustrated system has the necessary winch 20 for winding up a tow cable 22 which pulls the unit 16 through the pipeline. A winch 24 is provided for paying out the cable 26 which has electrical conductors through which the electrical power to the unit 16 is supplied and the output signal from the vidicon is transmitted to the cathode ray tube display screen 18.

Figure 2:
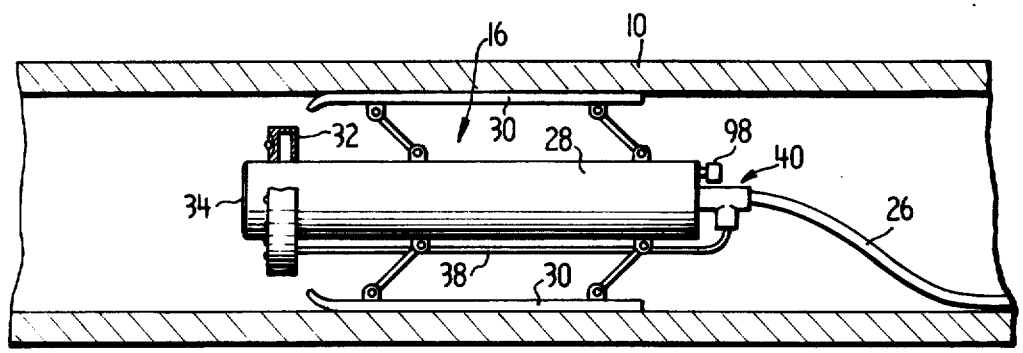
FIG. 2 is an enlarged view showing the camera in an underground pipeline.

The camera 28 in the underground unit 16 is shown mounted on a skid assembly, see also FIG. 2, so that the axis of the camera 28 is reasonably centered inside the pipeline 10. In practice, pipelines having different diameters are encountered, and the preferred system accordingly utilizes a skid assembly with three or more sliders 30 on arms that are suitably biased to keep the camera centered in the pipeline. If the camera 28 is positioned closer to one side of the pipeline 10 than the other, the picture on cathode ray tube 18 becomes more difficult to evaluate not only from the standpoint of the symmetry of the picture, but also because of uneven illumination of the region of the pipeline sidewall that is within the viewing angle of the camera.

Figures 3, 4:
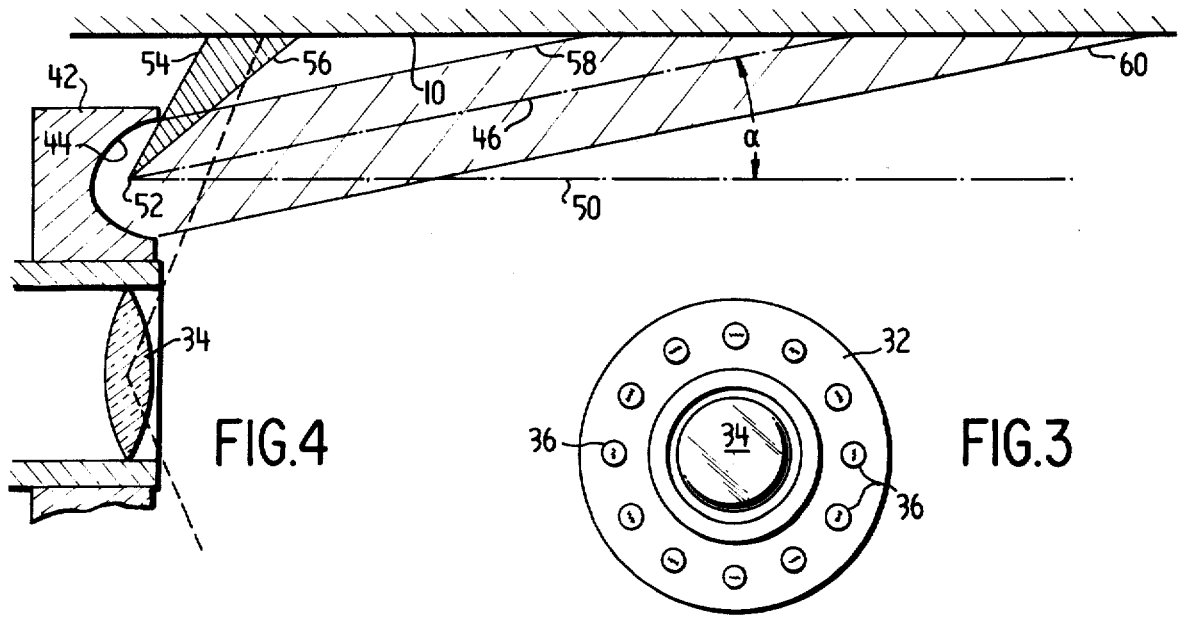
FIG. 3 is a front view of the camera showing the light sources arranged in a circular pattern completely surrounding the camera.
FIG. 4 is a side view in section showing a parabolic reflector for supporting the individual light sources of FIG. 3 around the camera lens.

With reference to FIG. 3, illumination is provided from a reflector unit 32 which includes a plurality of sources 36 of radiation that lie in a circular pattern surrounding the camera lens 34. The spectrum of the source of radiation should be matched to the spectrum of sensitivity of camera 28. The power for the radiation source 36 is supplied from cable 26 through connector 40, which will be described in conjunction with FIGs. 8 and 9, and cable 38 which runs along the outside of the housing of camera 28.

The interior walls of the pipeline in front of the camera lens 34 that are within the viewing angle of the camera can be observed on display device 18 with sufficient clarity to detect defects such as cracks and foreign objects. For optimum viewing, it is important that the maximum illumination intensity be directed toward the pipeline sidewall in front of the camera lens 34 and that a gradually decreasing intensity of illumination be provided on the pipeline wall as the region in question is closer to the camera lens. Such a pattern of illumination can provide on display device 18 a picture of a reasonable length of pipeline wall that has substantially uniform contrast.

One arrangement for achieving the desired pattern of radiation over a substantial pipeline length involves the use of a reflector 42 that has a reflecting surface 44 which has a parabolic cross section. The axis 46 of parabolic reflecting surface 44 points radially outwardly at an angle $\alpha$ with respect to a line 50 parallel to the longitudinal optical axis of lens 34.

As illustrated in FIG. 3, a plurality of illuminating elements 36 may be positioned at the focus circle of the parabolic reflector 44. When incandescent lamps are used, the lamp filaments may be oriented tangent to the focus circle for uniform illumination of the interior surface of the pipeline.

Referring to FIG. 4, the illumination provided by a light source at the focal point 52 can be considered as being composed of three component parts which are overlapping. The first part is radiation coming from the filament which is not reflected by the reflecting surface 44. The direct illumination from the filament 36 closely obeys the inverse square law and has the greatest influence in the shaded region between lines 54 and 56.

A second part of the illumination from the light source at the focal point 52 is provided by light reflected non-parabolically by the reflecting surface 44 and has its greatest influence in the area between lines 56 and 58.

The third part of the illumination from the light source at the focal point 52 is that which is parabolically reflected between lines 58 and 60 of FIG. 4. The annular area illuminated by parabolically reflected light has a length which is defined by the distance along pipeline wall 10 that is between lines 58 and 60, and governed in part by the angle $\alpha$, between the parabolic axis 46 and a a line 50 parallel to the optical axis of the camera. When a pipeline having a larger diameter is to be inspected, a different reflector 42 having a larger angle $\alpha$ may be desired. However, in pipelines having small diameters, the reflector 42 may have to be modified as shown in FIG. 5.

Figure 5:
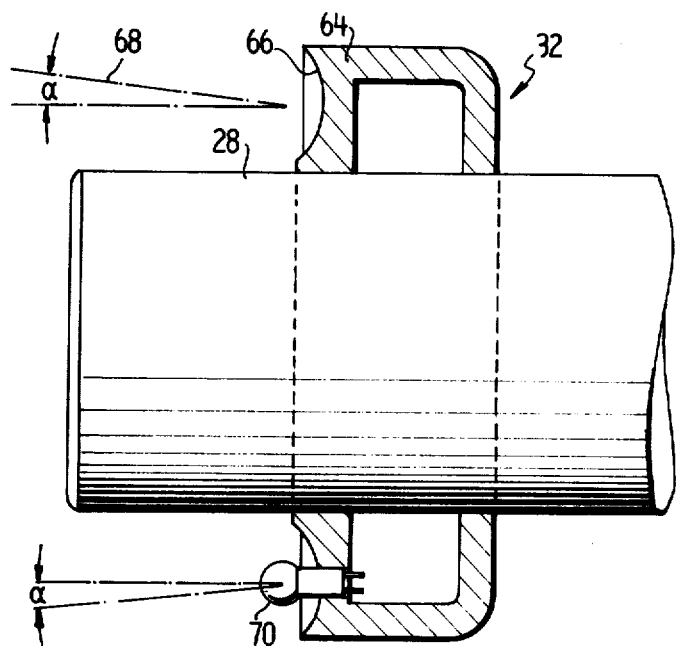
FIG. 5 is a view similar to FIG. 4 of a smaller type of parabolic reflector which is adapted for use in pipelines having small diameters.

Referring now to FIG. 5, the reflector unit 32 is shown mounted over the forward end of camera 28 and behind the camera lens 34. The reflector unit 32 may include a member 64 which has a recess 66 which has a cross section in the shape of a parabola. Parabola 66 thus has a central axis 68 which is disposed at an angle $\alpha$ from the camera axis.

Around the periphery of the camera 28, a plurality of light bulbs 70 are mounted in a substantially circular pattern surrounding the camera lens, as diagrammatically illustrated in FIG. 3. The bulbs 70 may be of a conventional type giving off visible radiation and the camera 28 may be of any conventional type which carries a film or mosaic that is responsive to the visible radiation, as in the case of the embodiment described in connection with FIG. 4.

With a reflector unit of the type shown in FIG. 5, it has been found desirable to locate the reflector unit rearwardly of the camera lens 34 so that "hot spots" of high intensity illumination that are provided by direct radiation and non-parabolically reflected radiation are located behind the field of view of the camera lens. This prevents the camera from picking up over-illuminated regions that can be comparatively close to the camera lens. Such hot spots of high intensity illumination will "white out" the picture, whether on a camera film or on a cathode ray tube unit 18, and obscure much of the detail of the wall surface in the pipeline. Where the camera is provided with an automatic target control, the regions of high intensity, if effective on the control system, can close the iris sufficiently so that other wall surfaces in the field of view of the camera lens are so dark as to cause the loss of detail in the picture.

To avoid this problem, reflector unit 32 may be made in such a manner as to be slidable along the length of camera 28 so that it can be located at an optimum position, taking into consideration the angle of view of the camera lens and the diameter of the pipeline.

In adapting the camera for use in pipelines having diameters of different sizes, it may be desirable to have a different reflector unit for each different pipeline diameter. Reflector units having parabolas that are deeper and more completely enclose the light bulb have the advantage that a larger percentage of the radiation energy is parabolically reflected and thus directed toward the pipeline sidewall. The length of the illuminated region can be better controlled so that the picture will have a more nearly uniform exposure. Modifying the shape of the reflecting surface from a true parabola in such a manner that the intensity of the radiation on the pipeline walls gradually reduces as the region gets closer to the camera lens will give even better quality pictures.

The embodiment shown in FIG. 5 is adapted for use in pipelines where the diameter is only slightly larger than the diameter of the camera and the reflector of FIG. 4 cannot be accommodated. The disadvantage of the FIG. 5 arrangement is that the efficiency of the reflector is less than is provided by the reflector shown in FIG. 4, as more of the radiation goes directly to the pipeline wall immediately surrounding the reflector unit 32 at a position not within the viewing angle of the camera lens. On the other hand, because the pipeline diameter is small, less radiation is needed to provide a satisfactory picture.

Figure 6:
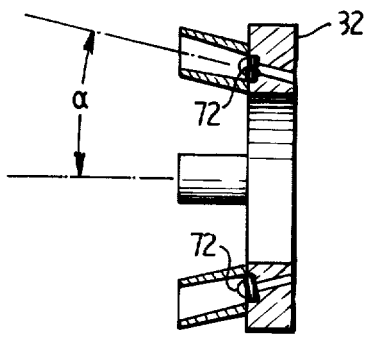
FIG. 6 is a view similar to FIG. 5 but adapted for use with solid state, infrared emitter type sources of radiation.
Figure 7:
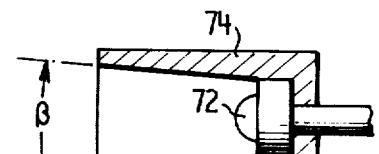
FIG. 7 is a side elevation in section of a single infrared, solid state type emitter with a reflector for confining the emitted energy into a desired included angle in the range of from 30° to 40°.

With reference to FIG. 6 and 7, the reflector unit 32 is here illustrated as including a plurality of solid state infrared emitters 72. A suitable solid state device may be GaAs solution-grown P—N junctions that are commercially available. These devices emit radiation in the near infrared region with peak wavelength ranges slightly above 900 nanometers (9,000 angstroms). Such solid state device emit radiation in a pattern that is confined to an included angle of between about 30° and 50° depending upon the particular manner of fabrication.

With a particular diode marketed by Texas Instruments as XL27, it has been found preferable to enclose the diode 72 in a housing 74 which has an interior wall of reflective material. Also, it is advantageous for the interior diameter of the housing to be slightly larger than the diameter of the diode 72 and to have conically shaped walls so that the radiation is concentrated in an included angle $\beta$ as shown in FIG. 7 which ranges between about 30° and 40°. Another embodiment would be to provide the reflective material as an integral part of the diode, thus eliminating the need for an external housing.

As shown in FIG. 4, the reflector housing 74 has its major axis directed at an angle $\alpha$ relative to the centerline of the pipeline and the major axis of the camera so as to direct the radiation onto a length of the pipeline wall which is within the field of view of the camera. This angle will vary with the viewing angle of the lens of the camera and also with the diameter of the pipeline.

With a solid state source of radiation as described above, the camera should have a vidicon which has a sensitivity to wavelength which is produced by the diode 72. A suitable vidicon is marketed by RCA as No. 4532 Vidicon which has a silicon target.

With the embodiment described in connection with FIGS. 6 and 7, several advantages are obtained. The use of the particular near-infrared wavelength allows full transmission of radiation without substantial atmospheric absorption which occurs at other wavelengths in the infrared band. Since the diodes require less power and produce less heat, they are more easily packaged in an explosion-proof system. Finally, due to increased efficiency at the particular wavelength in the range of 750 to 1,000 nanometers, it is possible to use a single reflector unit with the camera that will operate satisfactorily in a greater range of pipeline sizes than is possible with lamps operating at visible wavelengths.

Figure 8:
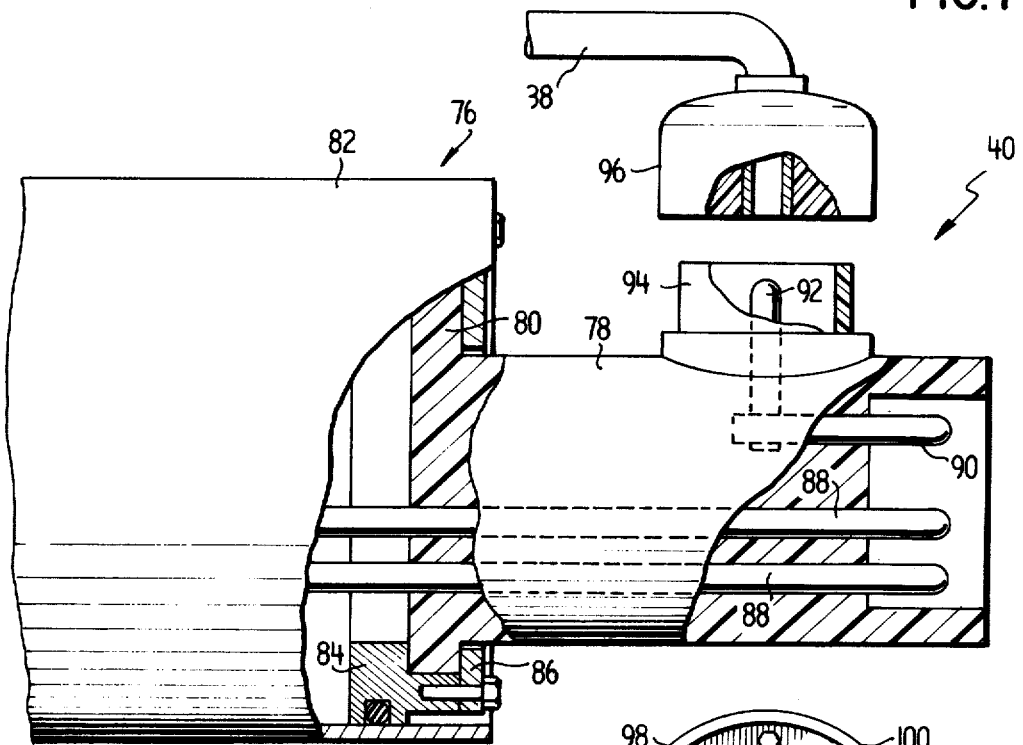
FIG. 8 is a side view in partial section showing the connector attached to the rear of the television camera which is used for towing the electrical cables behind the camera as the camera is moved through the pipeline.
Figure 9:
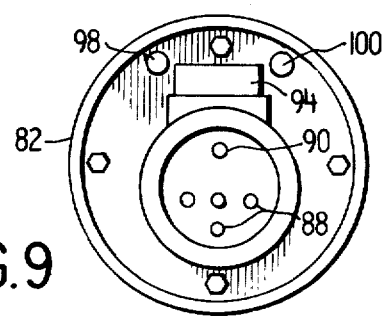
FIG. 9 is a rear end view of the connector shown in FIG. 8.

Referring now to FIGS. 8 and 9, the connector 76 of FIG. 2 is shown in greater detail. The connector 76 may include a central insulating body 78. A flanged portion 80 is attached to the end of the camera housing 82. The camera housing 82 includes a rear wall 84 and a ring 86 for clamping the flanged portion 80 of the connector 76 to the camera so that the trailing cable 26 (see FIG. 2) can be pulled through the pipeline.

Pins 88 for the connector 40 extend through the central body 78 and may be exposed at both ends for appropriate electrical connections. Another pin 90 may extend partially into the central body 78 where it may be joined by a further connecting pin 92 extending at right angles thereto. The connecting pin 92 extends upwardly and exteriorly of the central body 78. A mounting bracket 94 surrounds the pin 92 thereby permitting the attachment of a connector 96 thereto.

The central portion 78 of the connector 40 may be offset as illustrated in FIGS. 8 and 9, so that the cable 38 (see FIG. 2) extending along the outside of the camera from the connector 40 to the housing and reflector unit 32 for the radiation sources may lie flush with the outside of the housing for camera 28. This arrangement prevents snagging of the cable 38 on the pipeline crags or objects within the pipeline.

In operation, the connector 40 provides not only a sealed end piece for the camera 28 to prevent moisture and other contaminants from entering the camera housing, but also provides an offset connector for the cable 38 to the illuminating source for the camera. The cable powering the illuminating source for the camera need not, therefore, be spliced into the cable 26 of FIG. 2 at a point rearwardly of the camera, as was the prior practice. The use of a rugged connector 40 provides mechanical stability and reliability to the system and allows good pictures to be received even though the camera has traversed a substantial distance through the pipeline.

As shown in FIG. 9, the camera may be mounted in a cylindrical tube 82 which may be corrosion resistant and made of stainless steel. The housing may have an external diameter of approximately three inches and a length of over 20 inches, with seals at both ends to ensure complete water resistance.

Two shafts 98 and 100 shown in FIG. 2 and 9 may be provided with O-ring seals (not shown) which extend from the rear of the housing for camera 28 to permit external adjustment of the focus and iris from the rear of the camera. It will be appreciated that both iris and focus adjustments are normally controlled automatically through servo motors of conventional design. However, it has been found in pipeline inspection systems that once the iris and the focus of the camera have been set with the camera located in the pipeline and the radiation reflector properly adjusted, there is no need for either an automatic iris control or for a power controlled focus.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and intended to be covered by Letters Patent is:

1. A method for inspecting underground pipelines wherein a camera is transported through the pipeline comprising:

illuminating with radiation having a wavelength in the range of about 750 to 1,000 nanometers the pipeline sidewall surface area closest to and within the viewing angle of said camera as said camera moves through the pipeline;

viewing the pipeline sidewall surface area with said camera; and sensing the image viewed by said camera responsive to the range of radiation illuminating said pipeline sidewall surface area.

2. The method as defined in claim 1 including the steps of:

transmitting the image sensed in said sensing step to a location remote from said pipeline; and producing at said remote location a reproduced image of said image transmitted from said pipeline.

3. A method for inspecting underground pipelines comprising:

placing a camera in the pipeline with the centerline of the camera in substantial alignment with the pipeline center;

illuminating with radiation having a wavelength in the range of about 750 to 1,000 nanometers the pipeline sidewall surface area about the interior circumference of the pipeline which is closest to and within the viewing angle of the camera;

sensing the image viewed by said camera responsive to the range of radiation illuminating said pipeline sidewall surface area;

adjusting the focus and lens opening of the camera in accordance with the diameter of the pipeline and intensity of illumination of the pipeline sidewall area that is within the field of view of the camera; and transporting the camera and source of illumination through the pipeline.

4. The method as defined in claim 3 including the steps of:

transmitting the image sensed in said sensing step to a location remote from said pipeline; and producing at said remote location a reproduced image of the image transmitted from said pipeline.

5. A pipeline inspection system comprising:

frame means adapted for longitudinal movement through the pipeline to be inspected;

a camera carried by said frame means, said camera having a vidicon responsive to radiation having a wavelength in the range of about 750 to 1,000 nanometers;

a plurality of sources of radiation producing a peak intensity in the same wavelength range, each of said plurality of sources being carried by said frame means in spaced relation to surround said camera; and a plurality of reflectors each associated with one of said sources, each of said reflectors being generally conical about a longitudinal axis and confining the emitted radiation within an included angle between about 30° to about 40° from said longitudinal axis.

6. The system as defined in claim 5 wherein said reflectors are mounted with their longitudinal axes angularly related relative to the longitudinal axis of said camera for concentrating the radiation on the pipeline sidewall surface area that is closest to and within the field of view of said camera.

7. The system as defined in claim 6 wherein the camera includes a watertight casing, an iris control means, and a focus control means with both of said control means being located internally of said casing; and means for manually manipulating the control means for said iris and said focus control located at the rear end of said casing to allow adjustment of the iris and focus manually after the camera is placed into said pipeline.

8. The system as defined in claim 7 further including:

display apparatus including a cathode ray tube located outside the pipeline;

a cable including electrical conductors for supplying operating power from terminals located outside the pipeline to said camera and said radiation sources, and for transmitting electronic output signals from the vidicon to said cathode ray tube; and a tow cable connected to pull the camera through the pipeline.

9. The system as defined in claim 8 wherein:

the electrical conductor cable includes a connector rigidly mounted to a casing for the camera and connected to the camera at one end, said connector being connected at the other end to said electrical conductor cable with a coupling adapted to pull the cable along behind the camera as it moves through the pipeline, and said connector having an intermediate terminal for connection to one end of a cable that is connected to supply operating power to the radiation sources.

10. Apparatus for viewing the interior surface of a right circular cylinder comprising:

a camera having a lens which has a longitudinal axis;

a housing for the camera mounted for movement along the central axis of the right cylinder; and means having an annular concave radiation reflecting surface encircling the camera lens for illuminating an annular region of the wall surface of the right cylinder that is within the viewing angle of the camera lens including a plurality of sources of radiation located on said annular concave radiation reflecting surface and spaced apart to surround the camera lens in a substantially circular pattern.

11. Apparatus as defined in claim 10 wherein said annular concave surface has a parabolic cross section with the axis of the parabola angularly related to the axis of the camera lens.

12. Apparatus as defined in claim 11 wherein said sources of radiation comprise radiation emitting filaments that lie along a circle formed by the revolution about the lens axis of the focus of the parabola.

13. Apparatus as defined in claim 12 wherein the right circular cylinder is a pipeline, the camera is in a watertight casing having an iris control means and a focus control means both located internally of said casing, and means for manually manipulating the control means for said iris and said focus control, located at the rear end of said casing to allow adjustment of the iris and focus manually after the camera is placed into said pipeline.

14. Apparatus as defined in claim 13 further including:

display apparatus including a cathode ray tube located outside the pipeline;

a cable including electrical conductors for supplying operating power from terminals located outside the pipeline to said vidicon and said radiation sources, and for transmitting electronic output signals from the vidicon to said cathode ray tube; and a tow cable connected to pull the camera through the pipeline.

15. Apparatus as defined in claim 14 wherein:

the electrical conductor cable includes a connector rigidly mounted to the casing for the camera and connected to the camera at one end, said connector being connected at the other end to said electrical conductor cable with a coupling adapted to pull the cable behind the camera as it moves through the pipeline, and said connector having an intermediate terminal for connection to one end of a cable that is connected to supply operating power to said radiation sources.

* * * * *